(12) United States Patent
Yamamoto (10) Patent No.: US 9,933,050 B2
(45) Date of Patent: Apr. 3, 2018

(54) STEERING SYSTEM

(71) Applicant: JTEKT CORPORATION, Osaka-shi, Osaka (JP)

(72) Inventor: Yasuharu Yamamoto, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 6 days.

(21) Appl. No.: 15/278,873

(22) Filed: Sep. 28, 2016

(65) Prior Publication Data
US 2017/0097067 A1   Apr. 6, 2017

(30) Foreign Application Priority Data
Oct. 6, 2015   (JP) .................................. 2015-198619

(51) Int. Cl.
| | |
|---|---|
| F16H 7/08 | (2006.01) |
| B62D 3/12 | (2006.01) |
| B62D 5/04 | (2006.01) |
| F16H 7/02 | (2006.01) |
| F16H 25/20 | (2006.01) |
| F16H 37/12 | (2006.01) |

(52) U.S. Cl.
CPC ................. *F16H 7/08* (2013.01); *B62D 3/12* (2013.01); *B62D 5/0424* (2013.01); *F16H 7/023* (2013.01); *F16H 25/20* (2013.01); *F16H 37/124* (2013.01); *F16H 2007/0806* (2013.01); *F16H 2007/0842* (2013.01); *F16H 2007/0865* (2013.01); *F16H 2025/2081* (2013.01); *F16H 2025/2096* (2013.01)

(58) Field of Classification Search
CPC ................ B62D 5/0421; B62D 5/0424; F16H 2007/0806; F16H 2007/0842
See application file for complete search history.

(56) References Cited

U.S. PATENT DOCUMENTS

| | | | |
|---|---|---|---|
| 8,752,664 B2 * | 6/2014 | Rombold ................ | B60R 25/02 180/402 |
| 2017/0225705 A1 * | 8/2017 | Tomikawa ........... | B62D 5/0424 |

FOREIGN PATENT DOCUMENTS

JP       2007-112245 A       5/2007

* cited by examiner

*Primary Examiner* — Kevin Hurley
(74) *Attorney, Agent, or Firm* — Oliff PLC (57) ABSTRACT

A steering system is provided in which a bearing of a tension pulley has a reduced load-carrying capacity. A belt tension adjusting mechanism has a seat provided on an inner surface of a reduction gear housing so as to be able to swing, a rod that is in abutting contact with the seat (bent portion), a feed nut that is screw-threaded over the rod, and a spring member (helical torsion spring) that is fixed to the feed nut at its one end and to the reduction gear housing at the other end. When the belt is loosened, the feed nut is rotated by an elastic force of the spring member, and in conjunction with the rotation, the rod moves away from the feed nut to push the seat (bent portion).

6 Claims, 5 Drawing Sheets

MESHING RANGE R1

FIG.4B

MESHING RANGE R2

FIG.4C

MESHING RANGE R3

FIG.5

STEERING SYSTEM

INCORPORATION BY REFERENCE

The disclosure of Japanese Patent Application No. 2015-198619 filed on Oct. 6, 2015 including the specification, drawings and abstract, is incorporated herein by reference in its entirety.

BACKGROUND OF THE INVENTION

1. Field of the Invention

The invention relates to a steering system.

2. Description of the Related Art

A steering system has been available in which a driver's steering operation is assisted by transmitting a rotary motion of a motor to a ball screw mechanism via a toothed belt and a pulley to convert the rotary motion into a linear motion of a rack shaft. When tension of the belt decreases to loosen the belt, teeth of the belt may be offset from corresponding teeth of the pulley to cause improper meshing when an increased torque is transmitted between the belt and the pulley. This precludes the large torque from being transmitted. Thus, the steering apparatus is provided with a belt tension adjusting mechanism that adjusts the tension of the belt. The belt tension adjusting mechanism disclosed in Japanese Patent Application Publication No. 2007-112245 (JP 2007-112245 A) has a seat supported by a housing via a pin so as to be able to swing, a tension pulley rotatably supported by the seat so as to contact the belt, and a feed screw mechanism that presses the seat so as to press the tension pulley against the belt. An amount by which a screw in the feed screw mechanism is fed is adjusted to adjust an amount by which the tension pulley is pressed against the belt.

The belt is elongated due to aging, and thus, when a given period elapses, the belt has a lower tension than the belt in an initial state. Thus, the tension of the belt in the initial state needs to be set with an expected decrease in tension of the belt taken into account. To allow the tension of the belt to exceed a prescribed value when the given period elapses, the tension pulley needs to be pressed hard against the belt such that the belt in the initial state has a tension higher than the prescribed value. The amount by which the feed screw mechanism feeds the screw increases as a force at which the tension pulley is pressed against the belt increases. However, for example, a heavier load is imposed on a bearing that supports a nut such that the nut is rotatable as the seat is pressed harder by increasing the amount by which the screw is fed. Thus, a load-carrying capacity for the load on the bearing needs to be enhanced.

SUMMARY OF THE INVENTION

An object of the invention is to provide a steering system in which a bearing for a tension pulley has a reduced load-carrying capacity.

A steering system in an aspect of the invention includes a motor, a steered shaft that reciprocates in an axial direction, a nut that is screw-threaded over the steered shaft via a plurality of balls, a reduction gear having a driven pulley into which the nut is inserted and which is fixed to an outer peripheral surface of the nut, a driving pulley fixed to a rotating shaft of the motor so as to be rotatable integrally with the rotating shaft, and a belt wound round the driven pulley and the driving pulley, a belt tension adjusting mechanism provided to adjust a tension of the belt, a housing that houses the steered shaft, the nut, the reduction gear, and the belt tension adjusting mechanism, and a bearing that supports the nut such that the nut is rotatable with respect to an inner peripheral surface of the housing. The belt tension adjusting mechanism has a seat provided so as to be movable relative to the housing, a tension pulley that is supported so as to be rotatable with respect to the seat and that is in abutting contact with the belt, a bearing for the tension pulley that supports the tension pulley such that the tension pulley is rotatable with respect to the seat, a rod having a first end fitted in the housing so as to be non-rotatable around an axis and to be movable in an axial direction and a second end that is in abutting contact with the seat, an internal thread member that is screw-threaded over the rod at the second end of the rod, and a spring member having a first spring end fixed to the internal thread member and a second spring end fixed to the housing to rotationally bias the internal thread member so as to push the rod toward the seat. The rod is pressed against the seat to press the tension pulley against the belt.

In this configuration, for example, when the tension of the belt decreases, a force at which the tension pulley pushes the belt through the action of the spring member is stronger than a force at which the belt pushes the tension pulley through the action of the tension of the belt. At this time, based on a screw-threading relationship between the internal thread member and the second end of the rod, a bias force of the spring member is converted into a force that linearly moves the rod in a direction in which the rod is pushed toward the seat. As the seat is moved by being pushed by the rod, the tension pulley is pressed against the belt to increase the tension of the belt. The tension that has been reduced is increased, and the tension of the belt is no longer increased when the force at which the belt pushes the tension pulley is approximately equal to the force at which the tension pulley pushes the belt. As described above, the tension of the belt is automatically adjusted.

Since the tension of the belt is automatically adjusted, the tension of the belt in an initial state need not be set to a value much larger than the value of a minimum necessary belt tension determined in anticipation of a possible decrease in belt tension due to aging or the like. This reduces a force to which the bearing for the tension pulley is subjected in the initial state, enabling a reduction in the load-carrying capacity of the bearing for the tension pulley.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
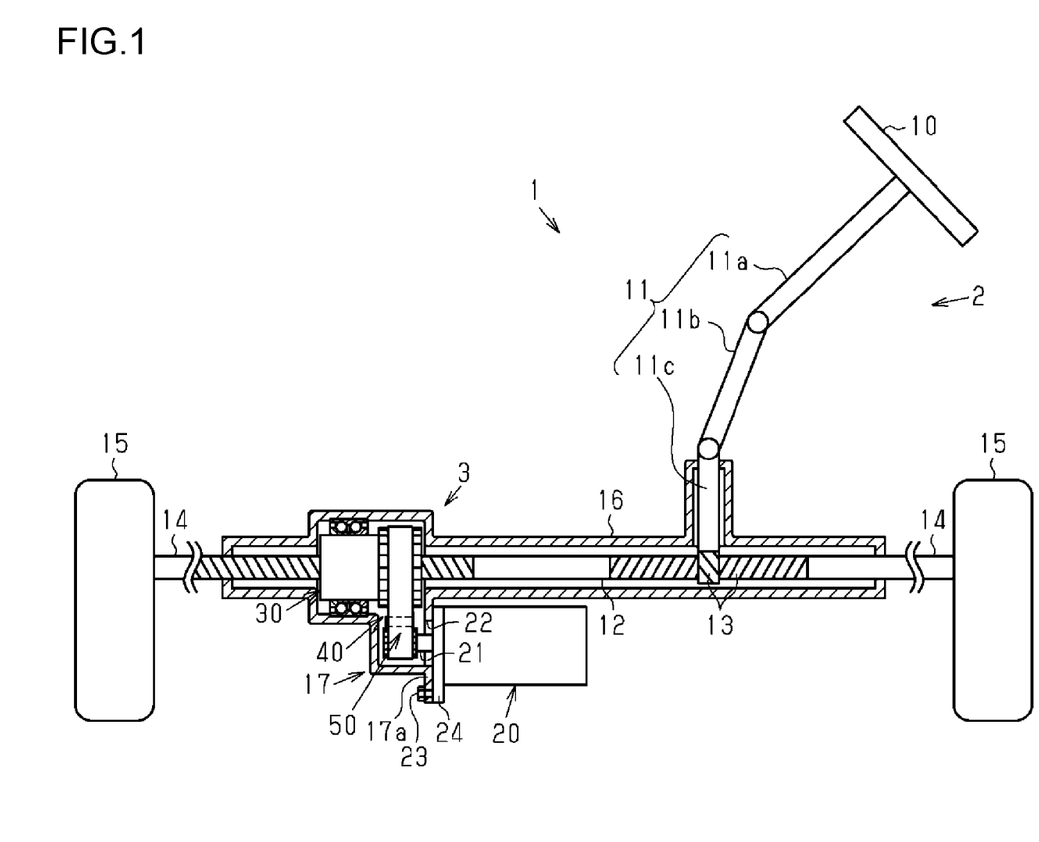
FIG. 1 is a configuration diagram depicting a general configuration of an electric power steering system in an embodiment.

An embodiment of a steering apparatus in the invention will be described below. As depicted in FIG. 1, an electric power steering system (EPS) 1 includes a steering mechanism 2 that steers steered wheels 15 based on a driver's operation of a steering wheel 10 and an assist mechanism 3 that assists the driver's steering operation.

The steering mechanism 2 includes the steering wheel 10 and a steering shaft 11 that rotates integrally with the steering wheel 10. The steering shaft 11 has a column shaft 11a coupled to the steering wheel 10, an intermediate shaft 11b coupled to a lower end of the column shaft 11a, and a pinion shaft 11c coupled to a lower end of the intermediate shaft 11b. A lower end of the pinion shaft 11c is coupled via a rack-and-pinion mechanism 13 to a rack shaft 12 serving as a steered shaft. Therefore, a rotary motion of the steering shaft 11 is converted into a reciprocating linear motion of the rack shaft 12 in an axial direction (a lateral direction in FIG. 1), via the rack-and-pinion mechanism 13, including the pinion shaft 11c and the rack shaft 12. The reciprocating linear motion is transmitted to the right and left steered wheels 15 via respective tie rods 14 each coupled to corresponding one of the opposite ends of the rack shaft 12, to vary the steered angle of the steered wheels 15.

An assist mechanism 3 is provided around the rack shaft 12. The assist mechanism 3 includes a motor 20 that is a source of an assist force, a ball screw mechanism 30 integrally attached around the rack shaft 12, and a reduction gear 40 that transmits a turning force of a rotating shaft 21 of the motor 20 to the ball screw mechanism 30. The assist mechanism 3 converts the turning force of the rotating shaft 21 of the motor 20 into the reciprocating linear motion of the rack shaft 12 in the axial direction, via the reduction gear 40 and the ball screw mechanism 30. The axial force applied to the rack shaft 12 serves as an assist force to assist the driver's steering operation.

The ball screw mechanism 30, the reduction gear 40, the pinion shaft 11c, and the rack shaft 12 are covered by the housing 16. The housing 16 is provided with a reduction gear housing 17 that houses a part of the reduction gear 40. The reduction gear housing 17 protrudes in a direction (downward in FIG. 1) crossing a direction in which the rack shaft 12 extends. A through-hole 22 is formed in an outer wall (a right side wall in FIG. 1) of the reduction gear housing 17. The rotating shaft 21 of the motor 20 extends through the reduction gear housing 17 via the through-hole 22. The motor 20 is fixed to the reduction gear housing 17 by coupling a flange portion 17a provided on the reduction gear housing 17 to a flange portion 24 provided on the motor 20, using bolts 23. The rotating shaft 21 is parallel to the rack shaft 12.

Figure 2:
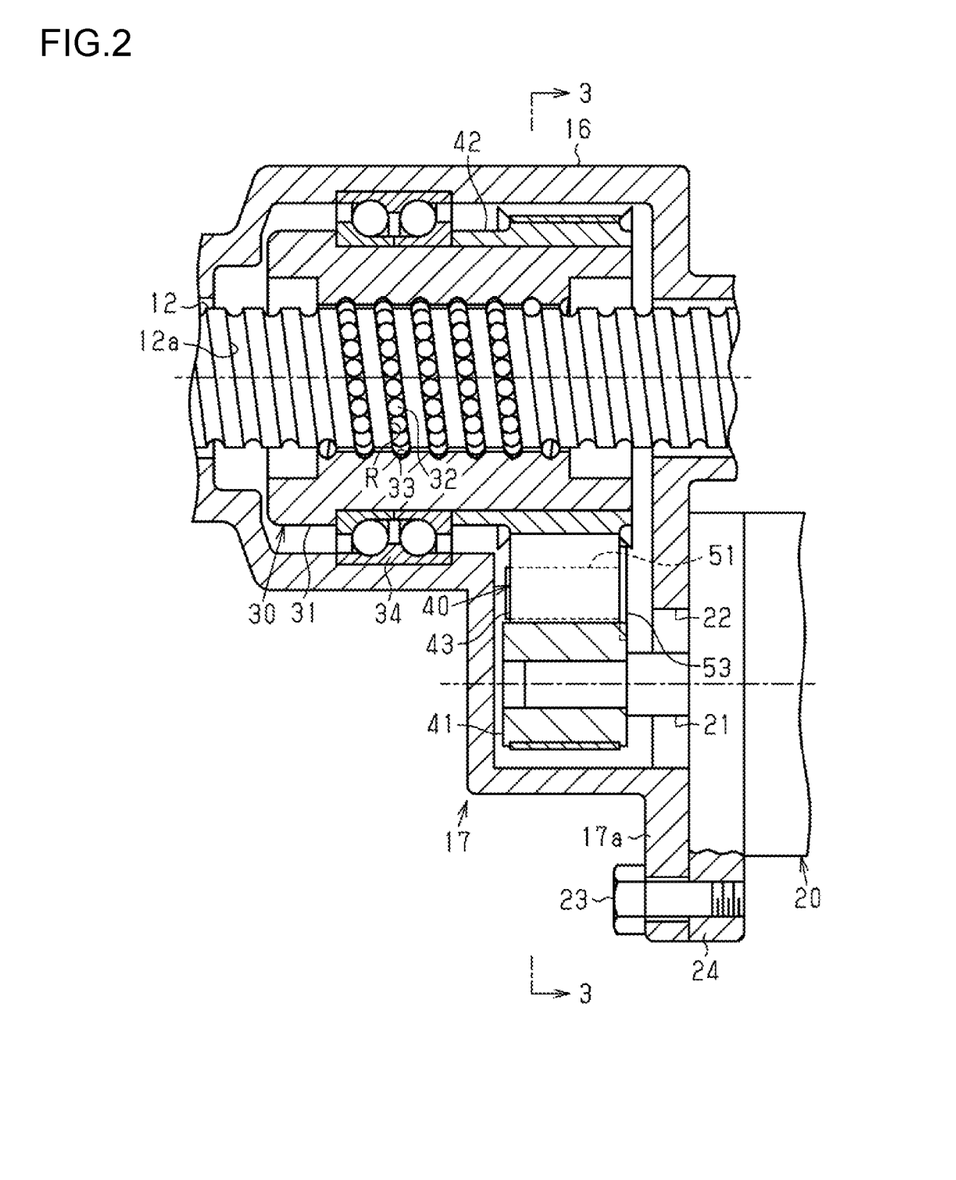
FIG. 2 is a sectional view depicting a general structure of an assist mechanism in the electric power steering system in the embodiment.

Now, an assist mechanism 3 will be described in detail. As depicted in FIG. 2, the ball screw mechanism 30 includes a cylindrical nut 31 that is screw-threaded over the rack shaft 12 via a plurality of balls 32. The nut 31 is supported so as to be rotatable via a cylindrical bearing 34 with respect to an inner peripheral surface of the housing 16. A helical groove 12a is formed in an outer peripheral surface of the rack shaft 12. A helical groove 33 corresponding to the groove 12a in the rack shaft 12 is formed in an inner peripheral surface of the nut 31. A helical space enclosed by the groove 33 in the nut 31 and the groove 12a in the rack shaft 12 functions as a rolling path R through which the balls 32 roll. Although not depicted in the drawings, the nut 31 has a circulation path that is open at two positions in the rolling path R and that allow the two openings to communicate with each other. Therefore, the balls 32 can circulate endlessly through the rolling path R via the circulation path in the nut 31. A lubricant such as grease is applied to the rolling path R to reduce frictional resistance and the like when the balls 32 roll. The bearing 34 has a load-carrying capacity sufficient to allow the bearing 34 to be continuously used even when subjected to a force (rated load) estimated to be insufficient to make the bearing 34 defective even when the force is repeatedly applied to the bearing 34 a specified number of times.

Figure 3A:
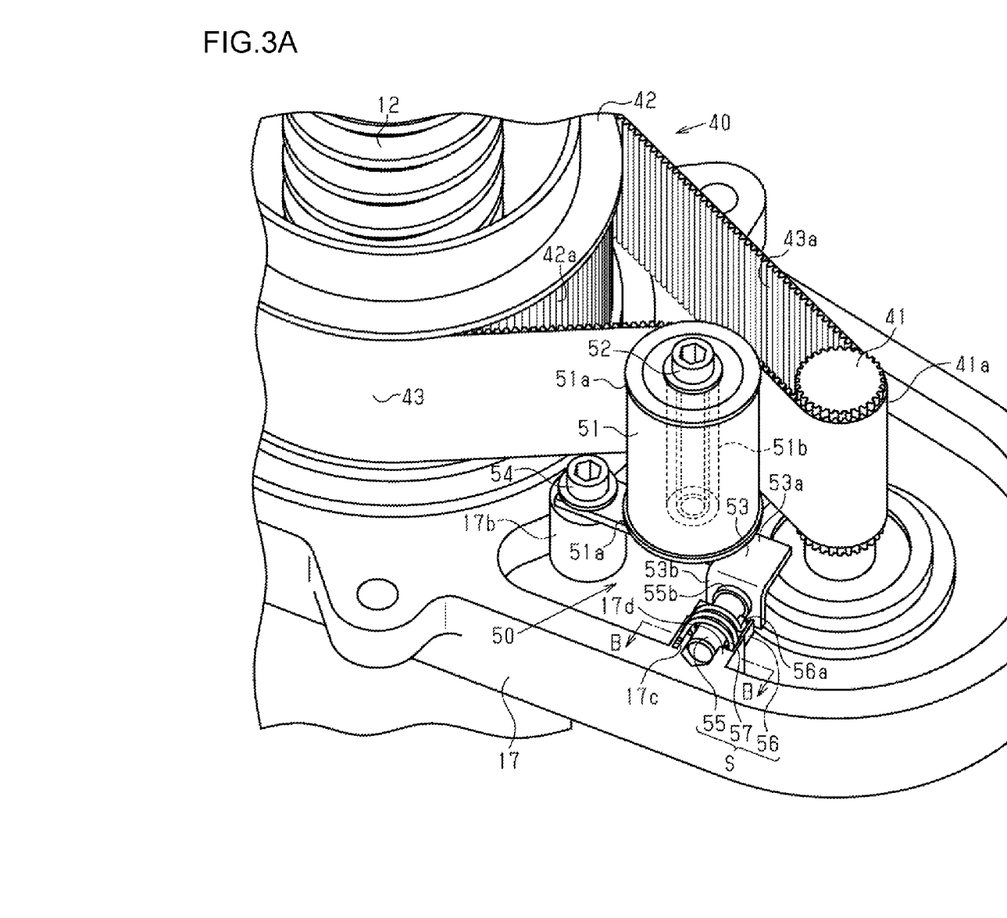
FIG. 3A is a perspective view of a belt tension adjusting mechanism obtained by cutting a housing along line 3-3 in FIG. 2.

The reduction gear 40 includes a driving pulley 41 integrally attached to the rotating shaft 21 of the motor 20, a driven pulley 42 integrally attached to an outer periphery of the nut 31, and a belt 43 wound around the driving pulley 41 and the driven pulley 42. The rotating shaft 21 of the motor 20, the driving pulley 41 attached to the rotating shaft 21, and a part of the belt 43 are arranged in an internal space in the reduction gear housing 17. As the belt 43, for example, rubber toothed belt including core wires is adopted. As the driving pulley 41 and the driven pulley 42, for example, toothed pulleys are also adopted. As depicted in FIG. 3A, teeth 43a are formed on an inner peripheral surface of the belt 43 (a surface that is in contact with each of the driving pulley 41 and the driven pulley 42). Teeth 41a and 42a that mesh with the teeth 43a are formed on outer peripheral surfaces of the driving pulley 41 and the driven pulley 42, respectively.

Therefore, rotation of the rotating shaft 21 of the motor 20 rotates the driving pulley 41 integrally with the rotating shaft 21. Rotation of the driving pulley 41 is transmitted to the driven pulley 42 via the belt 43. Consequently, the driven pulley 42 rotates integrally with the nut 31. The nut 31 rotates relative to the rack shaft 12, and thus, the balls 32 interposed between the nut 31 and the rack shaft 12 are subjected to load both from the nut 31 and the rack shaft 12 to circulate endlessly through the rolling path R. The endless circulation of the balls 32 converts the torque applied to the nut 31 into a force applied to the rack shaft 12 in the axial direction thereof. Thus, the rack shaft 12 moves in the axial direction with respect to the nut 31. The axial force applied to the rack shaft 12 serves as an assist force to assist the driver's steering operation. A belt tension adjusting mechanism 50 is provided inside the reduction gear housing 17 to apply tension to the belt 43.

Now, the belt tension adjusting mechanism 50 will be described below in detail. As depicted in FIG. 3A, the belt tension adjusting mechanism 50 has a seat 53 provided on an inner surface of the reduction gear housing 17 (flange portion 17a) so as to be able to swing, a cylindrical tension pulley 51 rotatably supported by the seat 53, and a feed screw mechanism S that presses the seat 53.

The seat 53 has a rectangular flat plate portion 53a and a bent portion 53b. The flat plate portion 53a is positioned on a plane orthogonal to a central axis of the driving pulley 41. The bent portion 53b is orthogonal to the flat plate portion 53a. A first end of the flat plate portion 53a is rotatably coupled with a bolt 54 to a tip surface of a cylindrical member 17b protruding from the reduction gear housing 17. The bent portion 53b is provided at a second end of the flat plate portion 53a in a longitudinal direction thereof. The seat 53 is formed, for example, by folding a portion of an L-shaped metal plate member that protrudes in a lateral direction The tension pulley 51 is arranged between a portion of the flat plate portion 53a in which the bolt 54 is inserted and a portion of the flat plate portion 53a in which the bent portion 53b is provided. A bearing 51b is provided around a central axis of the tension pulley 51. A bolt 52 is inserted into a through-hole formed along a central axis of the bearing 51b. The bolt 52 allows the tension pulley 51 to be rotatably coupled to the flat plate portion 53a. Rotating the seat 53 around the bolt 54 enables an increase and a reduction in a force that presses the tension pulley 51 against the belt 43. At opposite ends of the tension pulley 51 in the axial direction, flanges 51a are provided which are larger in diameter than a cylindrical portion of the tension pulley 51 that is contacted by the belt 43. While being sandwiched between the two flanges 51a, the belt 43 is in contact with the tension pulley 51. The flanges 51a restrain the tension pulley 51 from coming off from the belt 43. The tension pulley 51 is in abutting contact with the belt 43 so as to push a portion of the belt 43 between the driving pulley 41 and the driven pulley 42 slightly inward.

Figure 3B:
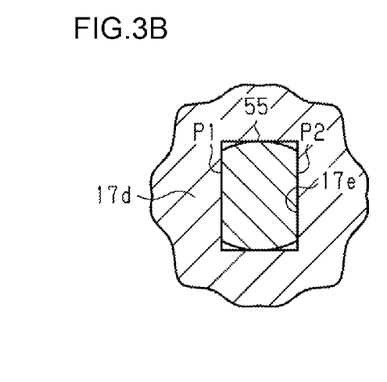
FIG. 3B is a sectional view obtained by cutting a rod and a protruding portion of a reduction gear housing along line B-B in FIG. 3A.

The feed screw mechanism S is provided between the bent portion 53b and a peripheral wall of the reduction gear housing 17. The feed screw mechanism S has a rod 55, a feed nut 56 serving as an internal thread member, and a spring member 57. An external thread portion is formed on an outer peripheral surface of the rod 55. The external thread portion is provided within a given range of the rod 55 including a second end thereof. As depicted in FIG. 3B, two flat surfaces P1 and P2 are formed at a first end of the rod as stopper portions. The two flat surfaces P1 and P2 are formed parallel to each other in a direction orthogonal to the axial direction of the rod 55. The first end is inserted into a stopper hole 17e formed in a protruding portion 17d protruding from the peripheral wall of the reduction gear housing 17. The stopper hole 17e has substantially the same sectional shape as that of the stopper portions of the rod 55 and is fitted over the stopper portions of the rod 55 via slight clearances. As depicted in FIG. 3A, an elastic body 55b is provided at a second end of the rod 55. The second end of the rod 55 is in abutting contact with the bent portion 53b via the elastic body 55b. As the elastic body 55b, for example, resin is used. The elastic body 55b absorbs impact exerted when the rod 55 comes into abutting contact with the bent portion 53b. Thus, possible impact sound is suppressed when the rod comes into abutting contact with the bent portion 53b.

The feed nut 56 has an internal thread portion formed on an inner peripheral surface of the feed nut 56. The internal thread portion is screw-threaded over the external thread portion of the rod 55. One of the opposite ends of the feed nut 56 that is located closer to the first end of the rod 55 is in abutting contact with an end face of the protruding portion 17d of the reduction gear housing 17. Based on the screw threading between the feed nut 56 and the rod 55, a torsional force (turning force) applied to the feed nut 56 is converted into a force that moves the rod 55 in the axial direction with respect to the feed nut 56. Thus, the rod 55 moves closer to or away from the bent portion 53b with respect to the feed nut 56 fixed in the axial direction. In the feed nut 56, a holding portion 56a is formed that is recessed in the axial direction like a hole.

The spring member 57 generates a bias force needed to press the tension pulley 51 against the belt 43. As the spring member 57, for example, a helical torsion spring is adopted. An outside diameter and an inside diameter of the spring member 57 is each uniform in the axial direction. The inside diameter of the spring member 57 is set slightly larger than the outside diameter of the rod 55. The rod 55 is inserted through the spring member 57. One end of the spring member 57 is fixed in the holding portion 56a of the feed nut 56, and the other end is fixed in a hole-like holding portion 17c formed in the reduction gear housing 17. The ends of the spring member 57 attached in the holding portion 56a and the holding portion 17c, respectively, are difficult to move. The spring member 57 generates a force (torsional torque) that twists the opposite ends of the spring member 57 around a central axis thereof. Based on a screw-threading relationship between the internal thread portion of the feed nut 56 and the external thread portion of the rod 55, the torsional torque is converted into a force that linearly moves the rod 55 in a direction in which the rod 55 is pushed toward the bent portion 53b of the seat 53. Therefore, the torsional torque of the spring member 57 keeps the rod 55 constantly pressed against the bent portion 53b.

The internal thread portion of the feed nut 56 and the external thread portion of the rod 55 include right-hand threads. The spring member 57 is provided so as to allow a counterclockwise torsional torque to act on the feed nut 56 in a direction in which the feed nut 56 is viewed from the spring member 57. The internal thread portion of the feed nut 56 and the external thread portion of the rod 55 may include left-hand threads. In this case, the spring member 57 is provided so as to allow a clockwise torsional torque to act on the feed nut 56 in a direction in which the feed nut 56 is viewed from the spring member 57.

Constantly pressing the rod 55 against the bent portion 53b allows the tension pulley 51 to be pressed against the belt 43. Thus, a force exerted in a direction away from the belt 43 acts on the tension pulley 51 due to an increased tension of the belt 43. That is, the force generated by the feed screw mechanism S to press the tension pulley 51 against the belt 43 increases the tension of the belt 43, whereas the force to which the tension pulley 51 is subjected as reaction (a force repelling an increase in the tension of the belt 43) decreases the tension of the belt 43. These forces act in opposite directions. The tension pulley 51 is pressed against the belt 43 to some degree to bring the two forces into balance with each other. When the two forces are in balance, the rod 55 is prevented from moving with respect to the feed nut 56. The tension pulley 51 is pressed against the belt 43 to allow the tension of the belt 43 to be adjusted. Driving of the belt 43 allows the tension pulley 51 to rotate using the central axis thereof as a center of rotation. A friction force exerted between the tension pulley 51 and the belt 43 is reduced by rotation of the tension pulley 51 in conjunction with driving of the belt 43.

The tension of the belt 43 is expected to decrease due to aging or the like. This is because the aging causes the belt 43 to be worn off or elongated. A reduced tension of the belt 43 is likely to cause jumping of the teeth of the belt 43 or may degrade the durability of the belt 43.

A reduced tension of the belt 43 brings the two forces out of balance. This is because a reduced tension of the belt 43 makes the force at which the tension pulley 51 pushes the belt 43 in accordance with the bias force of the spring member 57 (the force acting on the rod 55 through the feed nut 56) stronger than the force at which the belt 43 pushes the tension pulley 51 through the action of the tension of the belt 43 (the force acting on the feed nut 56 through the rod 55 through the action of the tension of the belt 43). In this case, the feed nut 56 rotates in accordance with the torsional torque of the spring member 57 to press the rod 55 against the bent portion 53b, pressing the tension pulley 51 against the belt 43. The tension pulley 51 pressed against the belt 43 increases the tension of the belt 43 that has been reduced. An increase in the tension of the belt 43 increases the force at which the belt 43 pushes the tension pulley 51. Then, when the tension of the belt 43 is approximately equal to the tension of the belt 43 in the initial state, the force at which the belt 43 pushes the tension pulley 51 comes into balance with the force exerted by the feed screw mechanism S and at which the tension pulley 51 pushes the belt 43. The rod 55 no longer moves with respect to the feed nut 56. That is, when the tension of the belt 43 decreases, the feed screw mechanism S automatically adjusts the tension of the belt 43.

When the feed nut 56 is moved in the axial direction with respect to the rod 55 utilizing the screw-threading relationship between the external thread portion of the rod 55 and the internal thread portion of the feed nut 56, for example, the feed nut 56 may rotate in a direction opposite to the direction of the torsion torque of the spring member 57 due to the force at which the belt 43 pushes the tension pulley 51. When the feed nut 56 rotates in the direction opposite to the direction of the torsional torque of the spring member 57, the tension pulley 51 is pushed back from the belt 43 to possibly make the tension of the belt 43 lower than the tension of the belt 43 in the initial state even with the use of the belt tension adjusting mechanism 50.

Thus, to restrain the feed nut 56 from rotating in the direction opposite to the direction of the torsional torque of the spring member 57, measures have been taken for the feed nut 56 so as to allow the self-lock action of the feed nut 56 to be exerted. The self-lock action is such that, with a torsional torque exerted on the feed nut 56, the feed nut 56 rotates to feed the rod 55 in the axial direction, whereas, even with an axial force exerted on the rod 55, the feed nut 56 does not rotate and the rod 55 is not fed in the axial direction. The self-lock action is exerted by allowing a sufficient friction force to be provided between the external thread portion of the rod 55 and the internal thread portion of the feed nut 56. In this case, the external thread portion of the rod 55 and the internal thread portion of the feed nut 56 meet a self-lock condition for screws. The measures for stopping rotation of the feed nut 56 make the rod 55 and the feed nut 56 screw-threaded to each other less likely to be loosened.

Now, description will be given of an increase in the meshing range of the meshing between the teeth 41a of the driving pulley 41 and the teeth 43a of the belt 43 resulting from provision of the belt tension adjusting mechanism 50. First, a case where the belt tension adjusting mechanism 50 is not provided will be described as a comparative example. Then, a case will be described where the belt tension adjusting mechanism 50 in the present embodiment is provided.

Figure 4A:
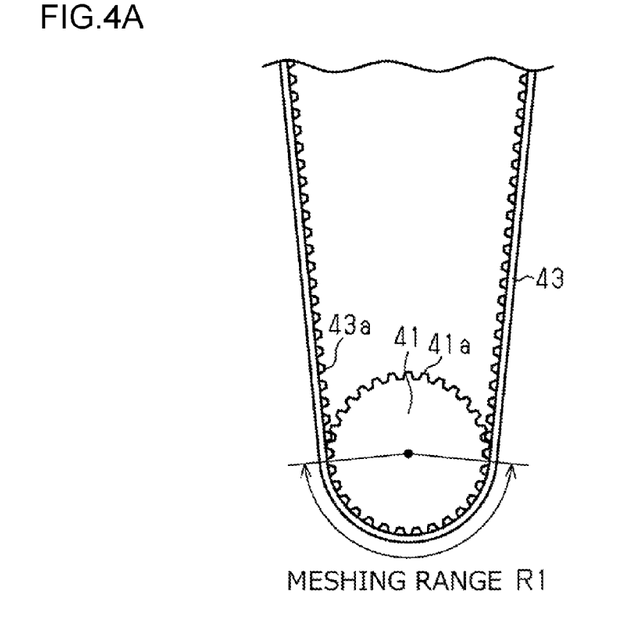
FIG. 4A is a schematic diagram depicting a meshing range of meshing between a driving pulley and a belt in the case where no belt tension adjusting mechanism is used.

As depicted in FIG. 4A, when the belt tension adjusting mechanism 50 is not provided, the teeth 41a of the driving pulley 41 mesh with the teeth 43a of the belt 43 within a meshing range R1 that is a given range in a circumferential direction of the driving pulley 41 and the belt 43. The meshing range R1 is positioned on an area on the side of the driving pulley 41 away from the driven pulley 42, for example, over approximately half the entire circumference of the driving pulley 41. In the entire area except for the meshing range R1, the teeth 41a of the driving pulley 41 do not mesh with the teeth 43a of the belt 43.

Figure 4B:
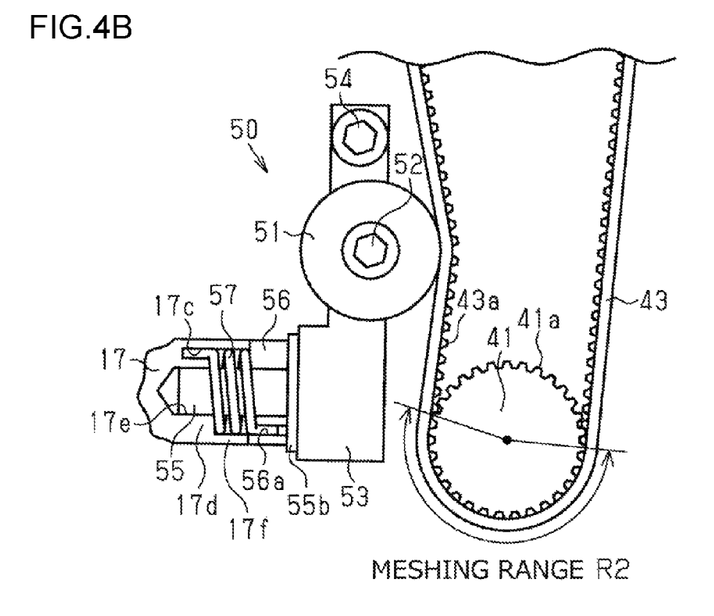
FIG. 4B is a schematic diagram depicting the meshing range of the meshing between the driving pulley and the belt in the case where a belt tension adjusting mechanism in an embodiment is used.

In contrast, as depicted in FIG. 4B, when the belt tension adjusting mechanism 50 is provided, the teeth 41a of the driving pulley 41 mesh with the teeth 43a of the belt 43 within a meshing range R2 that is a given range in a circumferential direction of the driving pulley 41. In this case, the tension pulley 51 is pressed against a portion of the belt 43 that is wound around the driving pulley 41 and the driven pulley 42 to mesh the driving pulley 41 with the belt 43 not only over the area on the side of the driving pulley 41 away from the driven pulley 42 but also over a small area of the driving pulley 41 that faces the driven pulley 42. That is, the meshing range R2 is larger than the meshing range R1. Thus, the tension pulley 51 is pressed against the portion of the belt 43 that is wound around the driving pulley 41 and the driven pulley 42 to enable an increase in an area where the teeth 41a of the driving pulley 41 mesh with the teeth 43a of the belt 43 and in the number of teeth 41a and teeth 43a which mesh with one another.

Now, a load imposed on the bearing 51b of the tension pulley 51 will be described in detail with reference to FIG. 2 and FIG. 3A. As a comparative example, a case will be described where the belt tension adjusting mechanism 50 without the spring member 57 is used. Then, a case will be described where the belt tension adjusting mechanism 50 provided with the spring member 57 in the present embodiment is used.

First, for the belt tension adjusting mechanism 50 without the spring member 57, the rod 55 remains in abutting contact with the bent portion 53b and does not move. Thus, even when the belt 43 is loosened, the tension pulley 51 remains in same position as that in which the tension pulley 51 is in the initial state. When the tension of the belt 43 decreases, the force is weakened at which the belt 43 pushes the tension pulley 51. When loosened, the belt 43 moves away from the tension pulley 51 to weaken the force at which the tension pulley 51 pushes the belt 43. Consequently, after the use of the belt tension adjusting mechanism 50 is started, the belt tension adjusting mechanism 50 fails to sufficiently adjust the tension of the belt 43. Thus, for the belt tension adjusting mechanism 50 without the spring member 57, the tension pulley 51 needs to be pressed hard against the belt 43 in the initial state. This is for maintaining the tension of the belt 43 higher than a minimum necessary tension after a given period passes. Thus, in the initial state, the tension of the belt 43 needs to be set much higher than the minimum necessary tension.

The load imposed on the bearing 51b of the tension pulley 51 in a radial direction increases as the tension of the belt 43 in the initial state increases. The bearing 5 1b needs to have a load-carrying capacity sufficient to prevent a possible failure in the bearing 51b even when an increased load is imposed on the bearing 51b.

Figure 5:
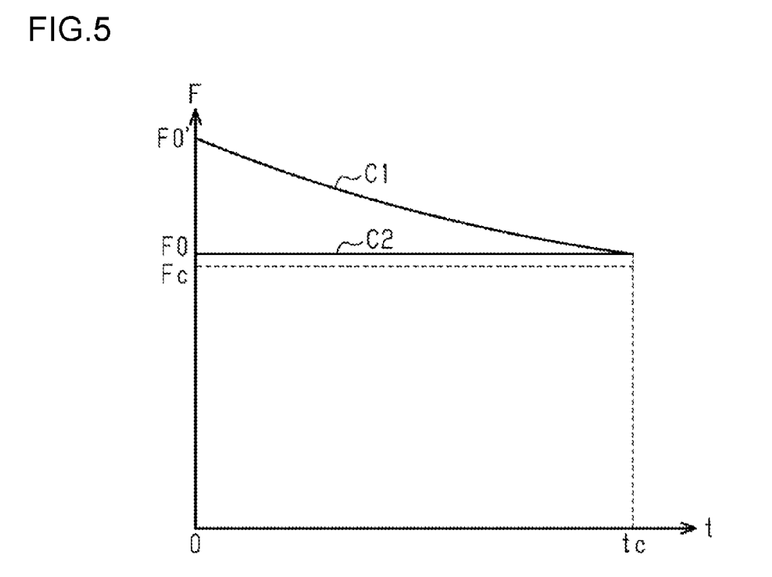
FIG. 5 is a graph illustrating a force to which a bearing for a tension pulley is subjected and passage of time.

FIG. 5 is a graph illustrating a relationship between a force F to which the bearing 51b is subjected and passage of time t. A curve C1 represents the maximum force to which the bearing 51b is subjected when the belt tension adjusting mechanism 50 without the spring member 57 is used. A curve C2 represents the maximum force to which the bearing 51b is subjected when the belt tension adjusting mechanism 50 provided with the spring member 57 is used.

In the initial state (time t is zero), a force F0' much stronger than a specified force Fc acts on the bearing 51b in association with the magnitude of the tension of the belt 43 in the initial state. The specified force Fc is, for example, a force that acts on the bearing 51b when the belt 43 is kept under a specified minimum necessary tension. Since the tension of the belt 43 in the initial state is set higher than the specified minimum necessary tension, the belt 43 can have a tension higher than the specified minimum necessary tension even after a given time tc passes. Thus, in the initial state, the force F to which the bearing 51b is subjected is stronger than the specified force Fc.

In contrast, when the belt tension adjusting mechanism 50 provided with the spring member 57 is used, in the initial state, the tension of the belt 43 is ideally equal to the specified minimum necessary tension. In order to achieve the specified minimum necessary tension even when the belt 43 is slightly loosened, the tension of the belt 43 is preferably provided with a margin by setting the tension of the belt 43 slightly higher than the specified minimum necessary tension. Thus, the force F to which the bearing 51b is subjected is equal to a force F0, which is substantially the same as the force obtained when the bearing 51b is subjected to the specified force Fc. As described above, even when the tension of the belt 43 decreases, the tension pulley 51 is pressed against the belt 43 by the torsional torque of the spring member 57 to increase the tension of the belt 43. Consequently, the force F to which the bearing 51b is subjected is ideally a substantially constant force F0 regardless of the time t. Thus, in the initial state, the force acting on the bearing 5 lb is equal to the force F0, which slightly stronger than the specified force Fc. The force F0 is weaker than the force F0'. That is, the force to which the bearing 51b is subjected when the belt tension adjusting mechanism 50 provided with the spring member 57 is used is weaker than the force to which the bearing 51b is subjected when the belt tension adjusting mechanism 50 without the spring member 57 is used. This enables a reduction in the load-carrying capacity of the bearing 51b. The bearing 51b may have at least a load-carrying capacity that allows the bearing 51b to withstand a force exerted when the tension of the belt 43 is kept equal to the specified minimum necessary tension.

Effects of the present embodiment will be described. (1) The belt tension adjusting mechanism 50 automatically adjusts the tension of the belt 43 to enable a reduction in the load-carrying capacity of the bearing 51b. This is because, in the initial state, the tension of the belt 43 may be set approximately equal to the specified minimum necessary tension. The tension of the belt 43 in the initial state and the tension of the belt 43 obtained a given time later may be set to be substantially the same.

In contrast, when the belt tension adjusting mechanism 50 without the spring member 57 is used, the tension of the belt 43 in the initial state needs to be set higher than the specified minimum necessary tension. Thus, the bearing 51b is subjected to a strong force, and the bearing 51b needs to be provided with a sufficient load-carrying capacity.

(2) The tension pulley 51 is pressed against the belt 43 to enable an increase in the area where the teeth 41a of the driving pulley 41 mesh with the teeth 43a of the belt 43. This also increases the number of those of the teeth 41a and the teeth 43a which mesh with one another. Thus, stress acting on each tooth can be dispersed, allowing the teeth 41a and the teeth 43a to be made more durable.

The present embodiment may be modified as follows. Embodiments described below may be combined together unless the resultant embodiment is technically contradictory. In the present embodiment, the elastic body 55b is provided between the rod 55 and the bent portion 53b of the seat 53 but may be omitted. In this case, the omission of the elastic body 55b degrades the capability of absorbing impact sound but does not significantly change the effects of the belt tension adjusting mechanism 50.

In the present embodiment, the flanges 51a are provided at the opposite ends of the tension pulley 51 in the axial direction but may be omitted. In this case, the belt 43 is somewhat more likely to come off from the belt 43. However, rotation of the driving pulley 41 is transmitted to the driven pulley 42 via the belt 43 unless the tension pulley 51 comes off from the belt 43.

In the present embodiment, the tension pulley 51 is pressed against the belt 43 so as to increase the meshing range of the meshing between the driving pulley 41 and the belt 43. The pressing may make substantially no change in the meshing range of the meshing between the driving pulley 41 and the belt 43.

In the present embodiment, the seat 53 has the flat plate portion 53a and the bent portion 53b. However, the invention is not limited to this. For example, the flat plate portion 53a may have a sufficient thickness to bring the rod 55 into abutting contact with side surfaces of the flat plate portion 53a.

Figure 4C:
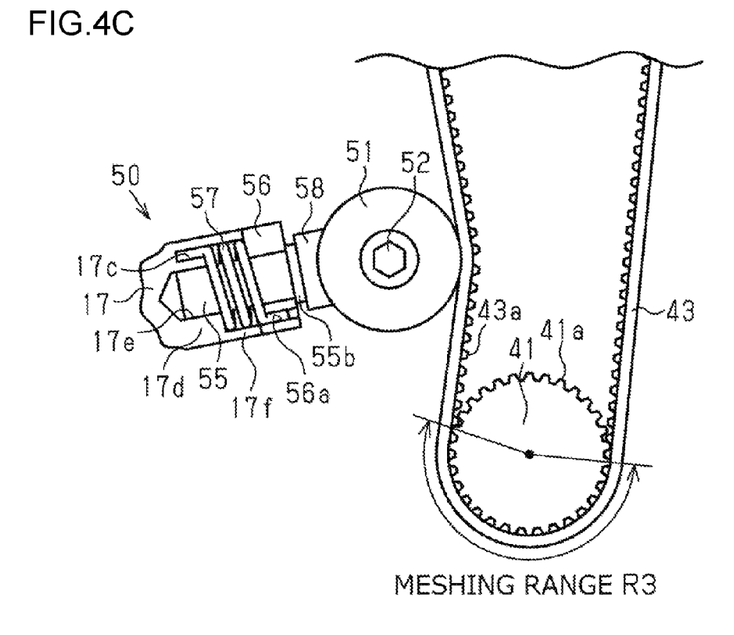
FIG. 4C is a schematic diagram depicting the meshing range of the meshing between the driving pulley and the belt in the case where a belt tension adjusting mechanism in another embodiment is used.

In the present embodiment, the seat 53 is rotated around the bolt 54 to press the tension pulley 51 against the belt 43. However, the invention is not limited to this. For example, as depicted in FIG. 4C, a seat 53 supporting the tension pulley 51 such that the tension pulley 51 is rotatable may be moved in the axial direction to press the tension pulley 51 against the belt 43.

In the present embodiment, the helical torsion spring is adopted as the spring member 57. However, the invention is not limited to this. Any spring member may be used so long as the spring member generates a bias force that allows the rod 55 to be pressed against the bent portion 53b.

In the present embodiment, in the curve C2 in FIG. 5, the force F is illustrated to be constant (force F0) regardless of the time. However, the invention is not limited to this. In actuality, the bias force (elastic force) of the spring member 57 is varied by extension and contraction thereof. Thus, the force F in the initial state has a value different from the value of the force F obtained the given time tc later. Thus, for example, the force F may have the maximum value in the initial state and decrease slightly over time. Even in this case, when the tension of the belt 43 decreases over time, the tension pulley 51 is further pressed against the belt 43 to increase the tension of the belt 43. Thus, compared to the tension of the belt 43 in a state where the tension pulley 51 does not move, the tension of the belt 43 in the initial state can be set to a value closer to the specified minimum necessary value.

In the present embodiment, the measures for stopping rotation of the feed nut 56 is taken so as to provide the feed nut 56 with the self-lock function. However, the invention is not limited to this. That is, the feed nut 56 with the self-lock function is preferably adopted. However, a feed nut with no self-lock function may be adopted. In view of the fact that the feed nut 56 with no self-lock function is more likely to be loosened than the feed nut 56 with the self-lock function, the feed nut 56 with no self-lock function may be used, for example, in a situation where a weak force is applied to the feed nut 56 in the axial direction.

In the present embodiment, a torsional torque is applied to the feed nut 56 to press the rod 55 toward the bent portion 53b of the seat 53. However, the invention is not limited to this. For example, the feed nut 56 may be omitted and an internal thread portion may be formed on the reduction gear housing 17 so that the first end of the rod 55 can be screw-threaded to the internal thread portion. In this case, a first spring end of the spring member 57 is fixed to the rod 55 and a second spring end of the spring member 57 is fixed to the reduction gear housing 17 so as to apply a torsional torque to the rod 55. Based on the screw-threading relationship between the first end of the rod 55 and the reduction gear housing 17, the torsional torque is converted into a force that moves the rod 55 in a direction in which the rod 55 is pushed toward the bent portion 53b of the seat 53. Thus, the second end of the rod 55 is constantly pressed against the bent portion 53b of the seat 53. The tension pulley 51 is kept constantly pressed against the belt 43.

In the present embodiment, the tension pulley 51 comes into abutting contact with an outer side of the belt 43 (a side on the opposite side of the belt 43 from the teeth 43a). However, an inner side of the belt 43 (a side of the belt 43 on which the teeth 43a are formed) may come into abutting contact with the tension pulley 51.

In the present embodiment, a toothed belt is used as an example of the belt 43. However, the invention is not limited to this. For example, a V belt may be adopted. Furthermore, toothed pulleys are used as examples of the driving pulley 41 and the driven pulley 42. However, the invention is not limited to this. In the present embodiment, the teeth 43a of the belt 43 mesh with the teeth 41a of the driving pulley 41 and the teeth 42a of the driven pulley 42 to transmit rotation of the driving pulley 41 to the driven pulley 42 via the belt 43. However, for example, rotation of the driving pulley 41 may be transmitted by friction between the driving pulley 41 and the belt 43 and the driven pulley 42 and the belt 43.

In the present embodiment, the invention is embodied as the EPS1. However, the invention is not limited to this. For example, the invention may be applied to a steer-by-wire (SBW) system. Instead of the SBW system, the invention may also be embodied as a rear-wheel steering system or a four-wheel steering system (4WS). For the SBW system, instead of the rack shaft 12 with a rack, a shaft with no rack may be adopted as a steered shaft. In this case, for example, a ball screw mechanism is used to apply a steering operation force to the steered shaft.

What is claimed is:

1. A steering system comprising:
a motor;
a steered shaft that reciprocates in an axial direction;
a nut that is screw-threaded over the steered shaft via a plurality of balls;
a reduction gear having a driven pulley into which the nut is inserted and which is fixed to an outer peripheral surface of the nut, a driving pulley fixed to a rotating shaft of the motor so as to be rotatable integrally with the rotating shaft, and a belt wound around the driven pulley and the driving pulley;
a belt tension adjusting mechanism provided to adjust a tension of the belt;
a housing that houses the steered shaft, the nut, the reduction gear, and the belt tension adjusting mechanism; and
a bearing that supports the nut such that the nut is rotatable with respect to an inner peripheral surface of the housing, wherein
the belt tension adjusting mechanism has a seat provided so as to be movable relative to the housing, a tension pulley that is supported so as to be rotatable with respect to the seat and that is in abutting contact with the belt, a bearing for the tension pulley that supports the tension pulley such that the tension pulley is rotatable with respect to the seat, a rod having a first end fitted in the housing so as to be non-rotatable around an axis and to be movable in an axial direction and a second end that is in abutting contact with the seat, an internal thread member that is screw-threaded over the rod at the second end of the rod, and a spring member having a first spring end fixed to the internal thread member and a second spring end fixed to the housing to rotationally bias the internal thread member so as to push the rod toward the seat, and
the rod is pressed against the seat to press the tension pulley against the belt.

2. The steering system according to claim 1, wherein
the seat is provided so as to be swingable around a first end of the seat,
the tension pulley is attached to a portion of the seat that is other than the first end, and
the rod presses the portion of the seat that is other than the first end in a direction of the swing to press the tension pulley against the belt.

3. The steering system according to claim 1, wherein
the internal thread member has a self-lock function to suppress, even when an axial force is applied to the rod, rotation of the internal thread member to restrain the rod from moving in the axial direction.

4. The steering system according to of claim 1, wherein an elastic body is interposed between the rod and the seat.

5. The steering system according to claim 1, wherein the belt is a toothed belt, and each of the driving pulley and the driven pulley is a toothed pulley.

6. A steering system comprising:
a motor;
a steered shaft that reciprocates in an axial direction;
a nut that is screw-threaded over the steered shaft via a plurality of balls;
a reduction gear having a driven pulley into which the nut is inserted and which is fixed to an outer peripheral surface of the nut, a driving pulley fixed to a rotating shaft of the motor so as to be rotatable integrally with the rotating shaft, and a belt wound around the driven pulley and the driving pulley;
a belt tension adjusting mechanism provided to adjust a tension of the belt;
a housing that houses the steered shaft, the nut, the reduction gear, and the belt tension adjusting mechanism; and
a bearing that supports the nut such that the nut is rotatable with respect to an inner peripheral surface of the housing, wherein
the belt tension adjusting mechanism has a seat provided so as to be movable relative to the housing, a tension pulley that is supported so as to be rotatable with respect to the seat and that is in abutting contact with the belt, a bearing for the tension pulley that supports the tension pulley such that the tension pulley is rotatable with respect to the seat, a rod having a first end screw-threaded to the housing and a second end that is in abutting contact with the seat, and a spring member having a first spring end fixed to the rod and a second spring end fixed to the housing to rotationally bias the rod so as to push the rod toward the seat, and
the rod is pressed against the seat to press the tension pulley against the belt.

* * * * *